US007962963B2

(12) United States Patent
Sharma

(10) Patent No.: US 7,962,963 B2
(45) Date of Patent: *Jun. 14, 2011

(54) MULTIMODAL RESOURCE MANAGEMENT SYSTEM

(75) Inventor: Rajesh Sharma, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 795 days.

This patent is subject to a terminal disclaimer.

(21) Appl. No.: 11/955,844

(22) Filed: Dec. 13, 2007

(65) Prior Publication Data

US 2008/0155660 A1   Jun. 26, 2008

Related U.S. Application Data

(63) Continuation-in-part of application No. 11/615,427, filed on Dec. 22, 2006, now Pat. No. 7,680,816.

(51) Int. Cl.
*H04L 9/32* (2006.01)

(52) U.S. Cl. .................. 726/27; 726/30; 726/2

(58) Field of Classification Search .................. 713/168, 713/170; 726/2, 26–30; 707/104.1, 3–5, 707/783–788; 715/200, 205, 234; 709/204
See application file for complete search history.

(56) References Cited

U.S. PATENT DOCUMENTS

| 7,003,464 B2 * | 2/2006 | Ferrans et al. | 704/270.1 |
| 7,174,509 B2 * | 2/2007 | Sakai et al. | 715/201 |
| 7,680,816 B2 * | 3/2010 | Sharma | 707/781 |

* cited by examiner

*Primary Examiner* — Hosuk Song

(57) ABSTRACT

A resource management system and methods for managing resources are disclosed. A resource management system may include a first communication interface configured to provide access to a first device, a second communication interface configured to provide access to a datastore, and a multimodal system in communication with the first and second communication interfaces. The multimodal system may be configured to receive a first communication request from the first device, generate a multimodal document in response to the first communication request, and serve the multimodal document to the first device using the first communication interface. The multimodal document may include instructions allowing for communication with the first device using at least one of a plurality of device interface modalities.

19 Claims, 5 Drawing Sheets

MULTIMODAL RESOURCE MANAGEMENT SYSTEM

CROSS-REFERENCE TO RELATED APPLICATIONS

This application is a Continuation-in-Part application of U.S. patent application Ser. No. 11/615,427, filed Dec. 22, 2006, which is incorporated herein by reference in its entirety.

BACKGROUND

Resource management systems generally must support a variety of disparate applications and environments for interacting with and manipulating resource data. Resource data are generally stored in one or more databases or data structures. The resource data may be stored in various formats, such as, for example, word processing documents, spreadsheet documents, or another proprietary format, or relational data base management system, etc. These applications may provide an interface that can be used by a specific user device associated with the databases to perform different functions. For example, a user may generally access certain resource data using an application or environment specific to devices associated with the user, e.g., a laptop or desktop computer of the user.

Supporting multiple applications and environments for the same resource data results in inefficiencies in the resource management system. For example, at least some resource data may need to be stored in multiple forms in order to be properly compatible with the various applications and environments through which a particular user may wish to access the resource data. Further, users may not be able to access resource data without specific associated devices. Accordingly, when a user is out of the office, or otherwise without the use of their associated device, the user cannot access the resource data.

Accordingly, there is a need in the art for a resource management system that allows for simplified storage and use of resource data while allowing access to the resource data across a variety of widely available applications or environments.

DETAILED DESCRIPTION

Figure 1:
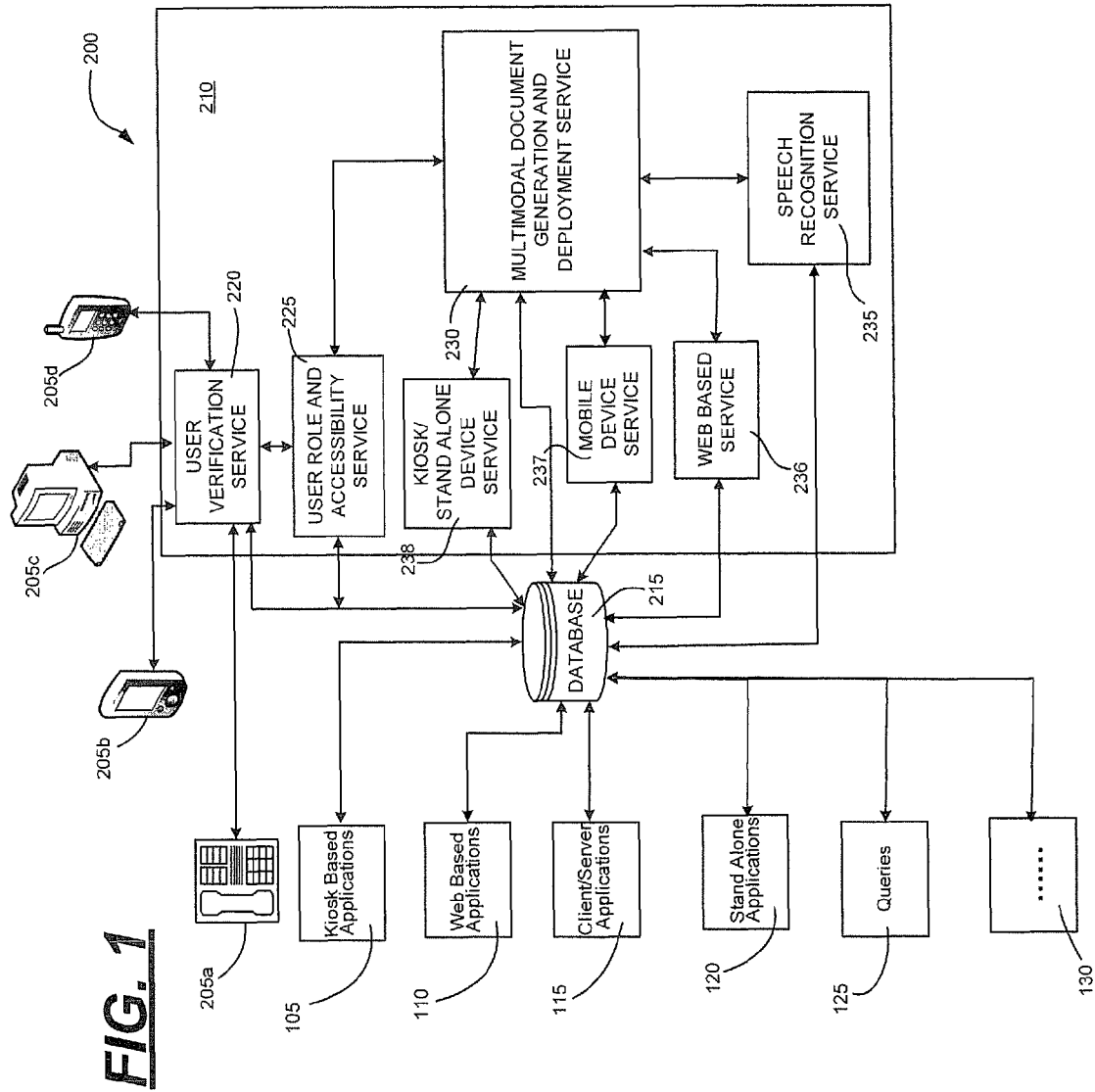
FIG. 1 illustrates an exemplary resource management environment.

Various examples of a resource management system and methods for managing resources are provided. A resource management system may generally include a first communication interface configured to provide access to a first device, a second communication interface configured to provide access to a datastore, and a multimodal system in communication with the first and second communication interfaces. The multimodal system is configured to receive a first communication request from the first device, generate a multimodal document in response to the first communication request, and serve the multimodal document to the first device using the first communication interface. The multimodal document includes instructions allowing for communication with the first device using at least one of a plurality of device interface modalities.

A method may include receiving a first communication that is associated with at least one of a plurality of data in a datastore, the first communication having a first interface modality, and receiving a second communication associated with at least one of the plurality of data, the second communication having a second interface modality. The method may further include generating a multimodal document having instructions for providing a dialog with a user using at least the first interface modality and the second interface modality, and providing the multimodal document through the first and second interface modalities.

The resource management system is generally configured to allow for communication of resource information between a user and a datastore, such as a database system, a file system, and/or a directory system. Specifically, examples provide for a generally universal or non-application-specific system for accessing and/or managing content in a datastore. For example, examples provided herein include a system where a user is not limited to accessing a datastore using only content management-specific applications. Furthermore, examples provided herein include a system that enables multimodal interaction between the user and the content management system.

Multimodal interaction allows users or user devices to dynamically select the most appropriate mode of interaction for the user's current needs. Generally, various modalities associated with devices disclosed herein may each include or represent a particular application or environment through which a user may manage resource data. For example, depending upon the capabilities of a device employed by a user to access resource data, the user may be able to provide user input in the form of speech, handwriting, keystrokes, or other user input modalities. Similarly, depending upon the capabilities of the user's device, the user may be able to receive user output presented via displays, audio mechanisms such as pre-recorded and/or synthetic speech, tactile mechanisms such as mobile phone vibrators and Braille strips, or other user output modalities. A system is therefore provided that allows a user to more easily switch between different modes of interaction when interacting with the content management system. Accordingly, users may more freely access resource data with a variety of devices, e.g., mobile phones, conventional telephones, computers, personal digital assistants (PDAs), etc.

The following description and corresponding figures are generally directed to exemplary illustrations of a resource management system. For example, one resource management system may include a justice management system that tracks resources associated with a penal or justice system, e.g., prisoners, parolees, bail bondsmen, etc. A resource management system, however, is just one example of a system that may benefit from the various illustrations. Accordingly, the multimodal systems described herein with respect to the resource management system may be applied to other management systems where a user or other entity desires to access information in a datastore.

Turning now to FIG. 1, a network environment 200 is illustrated that may include a number of telephony devices 205a, PDAs 205b, personal computers 205c, smart phones with visual display 205d (collectively known as multimodal devices 205), a multimodal system 210, and one or more datastores such as in the form of databases 215. In one implementation, multimodal system 210 may include a Justice System user verification service 220, a Justice System user role and accessibility service 225, a multimodal document generation and deployment service 230, a speech recognition service 235, a web based service 236, mobile device service 237 and a kiosk/stand alone device service 238. The components of network environment 200 may be located at remote locations, but are logically connected and can communicate through various networks, such as a data network using communication protocols, including Internet Protocol (IP), Session Initiation Protocol (SIP), Real Time Protocol (RTP), and Wireless Networking Protocols. In other exemplary illustrations, network components may be located at a same location where functionality of the components of multimodal system 210 and database 215 may be combined into a single entity. Database 215 may be operatively connected to a number of conventional resource management tools, such as kiosk based application 105, web-based management application 110, client/server management application 115, stand alone management application 120, query-based management application 125 and any other proprietary application 130.

In operation, when a Justice System user picks up his phone and goes off hook using one of telephony devices 205a, e.g., a voice over internet protocol (VOIP) phone, a conventional public switched telephone network (PSTN) phone, or a mobile (e.g., cellular) phone, or uses PDA 205b, or logs into the web using personal computer 205c, or smart phone 205d, the multimodal system 210 may authenticate the user with a communication interface associated with the device 205, e.g., user verification service 220. Multimodal system 210 may further determine an organization with which the user is affiliated, e.g., in the case of a multimodal justice system, which Justice department the user is associated with, as well as the user's role in that department, with user role and accessibility service 225. Once a user is authenticated and his/her role is identified, the information is passed to multimodal document generation and deployment service 230. Information presented to the user via multimodal system 210 may be dynamically modified based on the content of database(s) 215, which may be accessed via a second communication interface. A speech recognition service 235 may operate to receive voice information or "utterances" from the user via device 205. A second communication interface linked with the database 215, e.g., a web based service 236, mobile device service 237, and/or kiosk/standalone service 238, may then operate to receive voice information or "utterances" from the user and/or the user can also use a keypad and/or mouse and/or a tactile input device (pen, finger, etc.). In response to the received multimodal information (speech and/or keypad and/or mouse and/or tactile) associated with the respective multimodal document to which they respond, additional multimodal documents may be generated and/or deployed. Alternatively, various multimodal services, e.g., speech recognition service 235, web based service 236, mobile device service 237, kiosk/standalone device service 238, may operate to modify resource information or data in database(s) 215 based on the received multimodal information or request. In this manner, effective resource management functions may be performed without requiring that the user directly access the conventional resource management tools described above.

Once the user is identified and the user's role and accessibility are determined for various identified resources, e.g., justice system resources, the multimodal system 210 may implement the multimodal document generation and deployment service 230 for generating multimodal documents that provide the user with resource information in multimodal format and/or multimodal command options for managing and interacting with any resource information in the database 215. Accordingly, the multimodal document generation and deployment service 230 may generate a single multimodal document that provides instructions for presenting a multimodal dialog to a user using a plurality of different user interface modalities that may be available to the user on the user device. The multimodal document generation and deployment service 230 may then serve this multimodal document to the user device 205 that the user is utilizing to access the multimodal system 210. The multimodal document generation and deployment service 230 may be configured to serve the multimodal document using the same communication network and protocol used by the user device 205 to initially access the multimodal system 210. Once the user device 205 receives the multimodal document, the user device 205 may present the multimodal dialog using perhaps only those user interface modalities for which the user device has the user interface capabilities to support and/or that the user has indicated a preference for using.

If the multimodal document generation and deployment service 230 provides the user with a dialog comprising one or more command options and the user responds using one of the user device's available user input modalities, the multimodal document generation and deployment service 230 may invoke the speech-based recognition service 235, the web based service 236, the mobile device service 237, or other services depending on the modality of the user input. In other words, responses may be interpreted by multimodal system 210 according to a particular format or modality of the response. For example, if the user selects a command option by speaking the option into the microphone of a telephony device 205a, the speech-based recognition service 235 may then operate to receive the voice information or "utterances" from the user and interpret them for the multimodal document generation and deployment service 230. Similarly, web based service 236 and mobile device service 237 may operate to receive and interpret audio input (e.g., voice input), tactile input (e.g., keypad, mouse, and touchpad input), or other types of input that may typically be generated by web based user devices or mobile user devices, respectively. The speech-based recognition service 235, the web based service 236, and the mobile device service 237 are only provided as exemplary services that the multimodal system 210 may have for interpreting input received from a particular user input device. In other embodiments, the multimodal system 210 may include a different combination of services for performing the function of interpreting user input. In an embodiment, the Multimodal System 210 may comprise a different service for each possible type of device and/or user input modality that users may desire to use when accessing the resource management system.

In response to multimodal information or requests received from the user in response to a deployed multimodal document, the multimodal document generation and deployment service 230 may generate and deploy additional multimodal documents. Furthermore, the speech-based recognition service 235, the web based service 236, and/or the mobile device service 237 may operate to modify resource management information in the database 215 based on the received multimodal information or request. In this manner, effective resource management functions may be performed without requiring that the user directly access an application-specific resource management tool described above.

Multimodal system 200 and/or database 215 may include any one of a number of computing devices known to those skilled in the art, including, without limitation, a computer workstation, a desktop, notebook, laptop, or handheld computer, or some other computing device known to those skilled in the art. Computing devices such as the foregoing may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system.

Computing devices in various embodiments such as multimodal system 200 and/or database 215 may each include instructions executable by one or more computing devices such as those listed above. Such instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Figure 2:
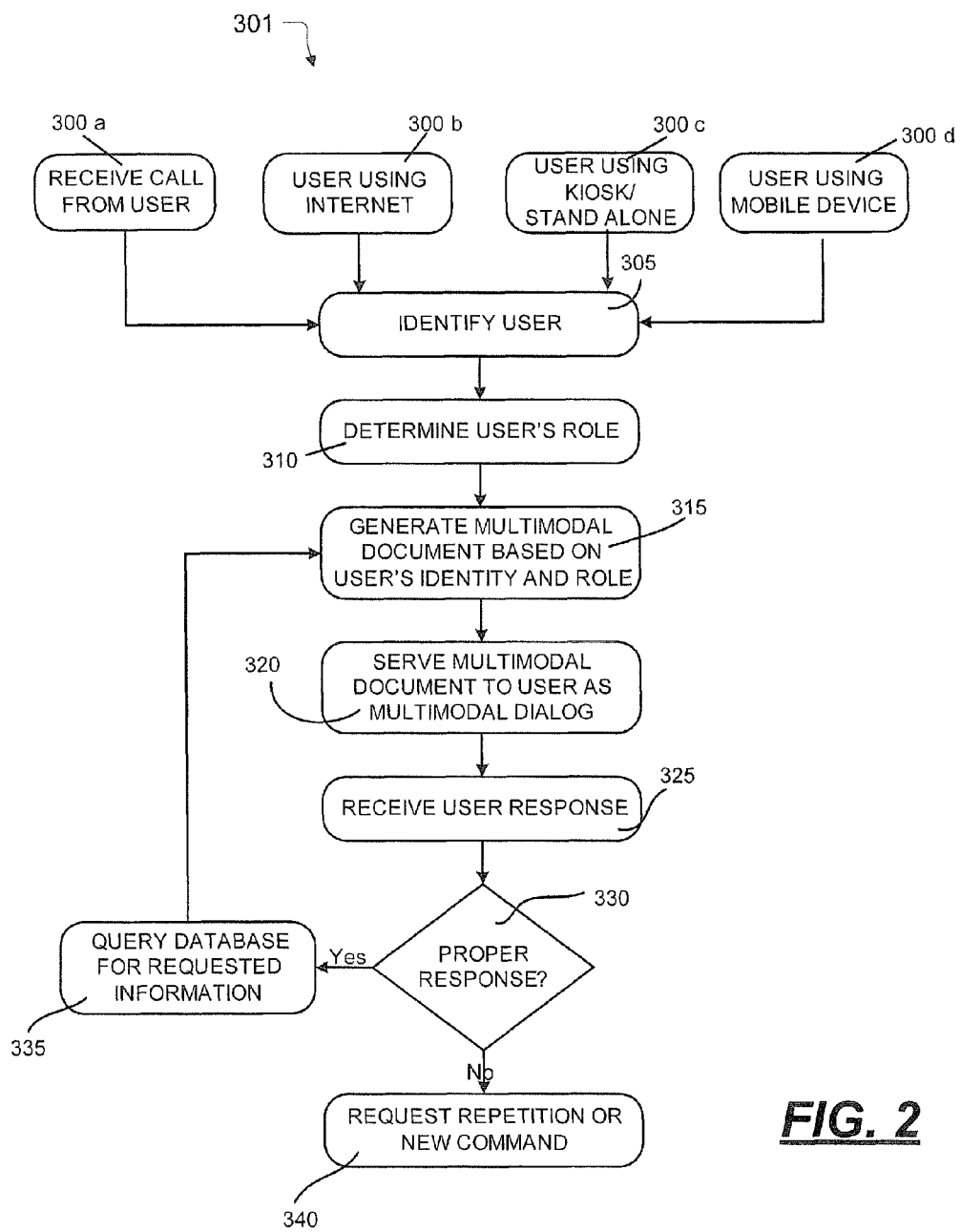
FIG. 2 is an exemplary process flow diagram for a resource management system.

Turning now to FIG. 2, a process 301 for managing resource data is illustrated. Process 301 may begin in step 300, where multimodal system 210 receives a call from a user via telephony device (300a), web based service (300b), a kiosk/standalone application (300c), or a mobile device such as PDA, smart phone, etc. (300d). Proceeding to step 305, the user may be identified by user verification service 220. In one example, a Justice System user verification service 220 may be configured to authenticate a user using any suitable methodology, such as, biometric and/or informational interrogation. For example, a Justice System user may be prompted to speak a certain phrase or personal identification number (PIN). In a biometric interrogation, a received voice response may be statistically compared to a voice print previously stored in a Justice System user profile maintained in database 215 on behalf of the user to ascertain and verify the identity of the user. Additionally, a multimodal response(s) may be further examined to determine the accuracy of the Justice System user's response, to provide an additional level of security and authentication. Furthermore, multimodal system 210 may interpret responses or inputs by the user based upon a format or mode of the response. For example, authentication information may be provided in more than one format, e.g., as a password recognized over telephony device 205a, a PIN entered on a keypad of a PDA 205b, computer 205c, or mobile device 205d, etc., according to the device 205 the user employs to interact with multimodal system 210. In a solely informational interrogation, the received multimodal response(s) may be recognized and compared to a correct response without performing biometric verification. Process 301 may then proceed to step 310.

In step 310, the user's access to projects or types of information associated with those projects may be determined by user role and accessibility service 225. In one example, a user role and accessibility service 225 may examine Justice System information in database(s) 215 associated with the Justice System user's identification to determine the Justice System functions that the user is permitted to access and perform, respectively. For example, a particular Justice System user may be identified as a Parole Officer for a given Justice System department and may be permitted to perform Justice System functions commensurate with that role. Similarly, a Justice System user identified as a Parolee may be provided with access to a significantly reduced number of Justice System functions. Process 301 may then proceed to step 315.

In step 315, multimodal document generation and deployment service 230 may generate a multimodal document based on the user's available options. For example, an initial multimodal document may be generated indicating or otherwise listing Justice System functions for which the user has been permitted access. Process 301 may then proceed to step 320.

In step 320, a multimodal document is served to the user for the voice and/or keypad and/or mouse and/or tactile input(s) (320). Multimodal language may employ an extensible markup language (XML) format to specify interactive voice dialogues between a human and a multimodal device. Further, a multimodal document may follow the World Wide Web Consortium (W3C) multimodal interaction framework. Proceeding to step 325, multimodal system 210 may receive a voice and/or keypad and/or mouse and/or tactile response(s) or request(s) from the user at speech recognition service 235, web based service 236, mobile device service 237, kiosk/standalone device service 238. Depending on the Justice System user's response(s) and the grammars generated to recognize the response, information or additional options may be provided to the user. For example, multimodal system 210 may determine whether the received voice and/or keypad and/or mouse and/or tactile response are an appropriate or recognized response in step 330. As described farther below, a variety of response grammars for the multimodal document may be defined to facilitate recognition of a number of suitable queries. For example, a defined grammar for a Parole Officer may enable recognition and response to phrases such as "Give me the list of my associated Parolees," "Who is behind their report-in schedule?" etc. In response to a recognized request, multimodal system 210 may query database(s) 215 for the proper response in step 335 and return to step 315, where the information is forwarded to multimodal specifications service 405, thereby initiating creation and serving of a responsive multimodal document that includes an answer to the user's request. If a received response is not recognized, multimodal system 210 may request clarification or repetition from the Justice System user as shown at step 340.

Figure 3:
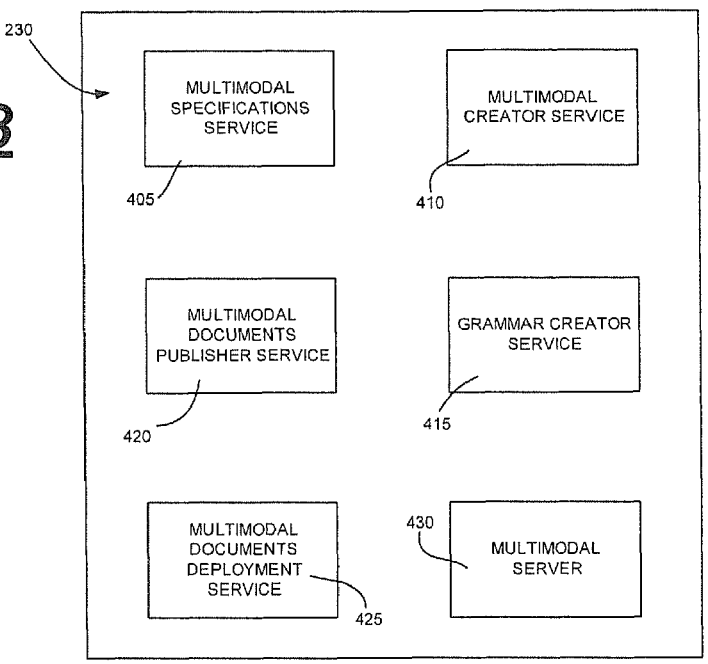
FIG. 3 is a schematic diagram illustrating an exemplary multimodal document generation and deployment service.

Turning now to FIG. 3, one exemplary illustration of a multimodal document generation and deployment service 230 is shown in further detail. Multimodal document generation and deployment service 230 may include a multimodal specifications service 405, a multimodal elements creator service 410, a grammar creator service 415, a multimodal documents publisher service 420, a multimodal documents deployment service 425, and a multimodal server 430.

Multimodal specifications service 405 may be configured to specify various defined multimodal elements, and relationships between them, as recommended, for example, by the W3C multimodal group.

Multimodal elements creator service 410 may be configured to use data from database(s) 215 that is associated with a user's identification or access permissions level and create multimodal documents containing a root element and associated child elements for data that the user is permitted to access.

Grammar creator service 415 may be configured to create any necessary grammar to enable a user to speak the necessary function they would like to perform. The format of the grammar may be of any type, for example Speech Recognition Grammar Specification (SRGS), Grammar Specification Language (GSL), etc. For example, in an active Justice System function, e.g., "Update parolee's home address," grammar creator service 415 may create grammar that enables a user, e.g., a Parole Officer, to request Parolee information using the following statement: "Give me the home address of Parolee XYZ." Accordingly, multimodal system 210 may properly interpret user responses to information provided to the user in a multimodal document via multimodal server 430.

Multimodal documents publisher service 420 may be configured to publish a multimodal document for a particular Justice System user in order to be deployed by multimodal document deployment service 425. In one implementation, multimodal documents may be tailored differently and/or based on defined user proficiencies and capabilities. For example, users designated as expert users may be provided with abbreviated menu options or other multimodal shortcuts to increase the speed with which multimodal navigation may be performed. Alternatively, multimodal documents provided for more novice users may result in more descriptive voice prompts being served to the user.

Once created and published, a multimodal document may be deployed by multimodal documents deployment service 425 to a multimodal server 430. In one exemplary illustration, multimodal server 430 may be an application server and/or web server or any other type of server that can serve the multimodal documents to the user via telephony device (205a), PDA (205b), computer (205c), smart phone (205d), etc.

Figure 4:
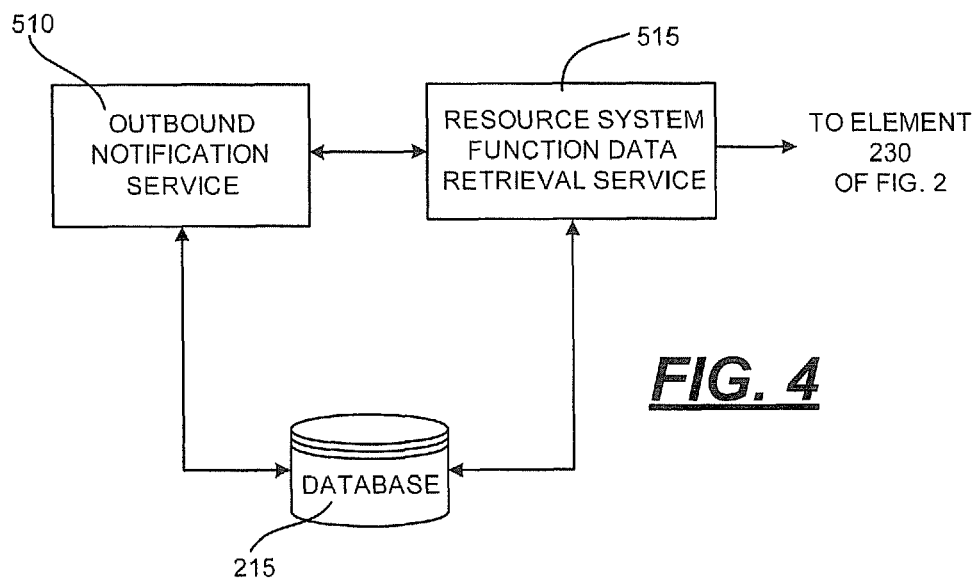
FIG. 4 is a schematic diagram of an exemplary outbound call notification system.

Turning now to FIG. 4, multimodal system 210 may perform outbound notification to devices associated with a resource management system user, e.g., telephony devices 205a, PDAs 205b, personal computers 205c, smart phones/pagers 205d, either upon request from a user or unilaterally in accordance with desired organizational rules. For example, Justice System users may ask multimodal system 210 to place outbound notifications to individuals or groups associated with a Justice System. In response to such a request, multimodal system may dial a phone number(s), send an email or text message, page an individual, or otherwise initiate a communication from the requested user to a resource, e.g., another user associated with the first user, such as a parolee tracked within the resource management system by the user, a supervisor of the user, etc. In this manner, efficient communication between resource system participants or users may be facilitated. As shown in FIG. 4, multimodal system 210 may include an outbound notification service 510 and a critical state data retrieval service 515. Each of these services 510 and 515 may be operatively connected to database(s) 215 and multimodal document generation and deployment service 230.

More specifically, outbound notification service 510 may be configured to monitor Justice System functions in the form of an outbound notification to data retrieval service 515. Critical functions of a resource system may be defined by desired organizational rules. For example, a parolee tracked in a resource management system who is one day behind their "report-in" date may trigger an outbound notification stating that the parolee has not reported at their required "report-in" time. Resource data retrieval system 515 may generally monitor various organizational rules that are set, e.g., when no record of a "report-in" date associated with a particular parolee exists, i.e., has not been entered by the responsible parole officer, and the report-in date has passed. Any other desired organizational rules regarding critical states of various resource data may be set, and may be customized for a particular resource monitoring system.

Service 510 may provide any necessary information (for example parolee's name, parole officer's name, report-in time, etc.) to Justice System functions data retrieval service 515. Data retrieval service 515 may retrieve additional information from database(s) 215 upon receipt of an outbound notification from service 510 in order to provide desired information regarding a critical resource status. For example, Justice System functions data retrieval service 515 may retrieve identification and contact information for the parole officer, parolee, etc., for a Justice System application. Once all desired or necessary information is gathered, data retrieval service 515 may perform an outbound notification using a telephone number, e-mail, text message, paging service, etc. Additionally, as shown in FIG. 4, the resource management system function's information may be provided to multimodal document generation and deployment service 230 for generation and deployment of a suitable multimodal document.

Figure 5:
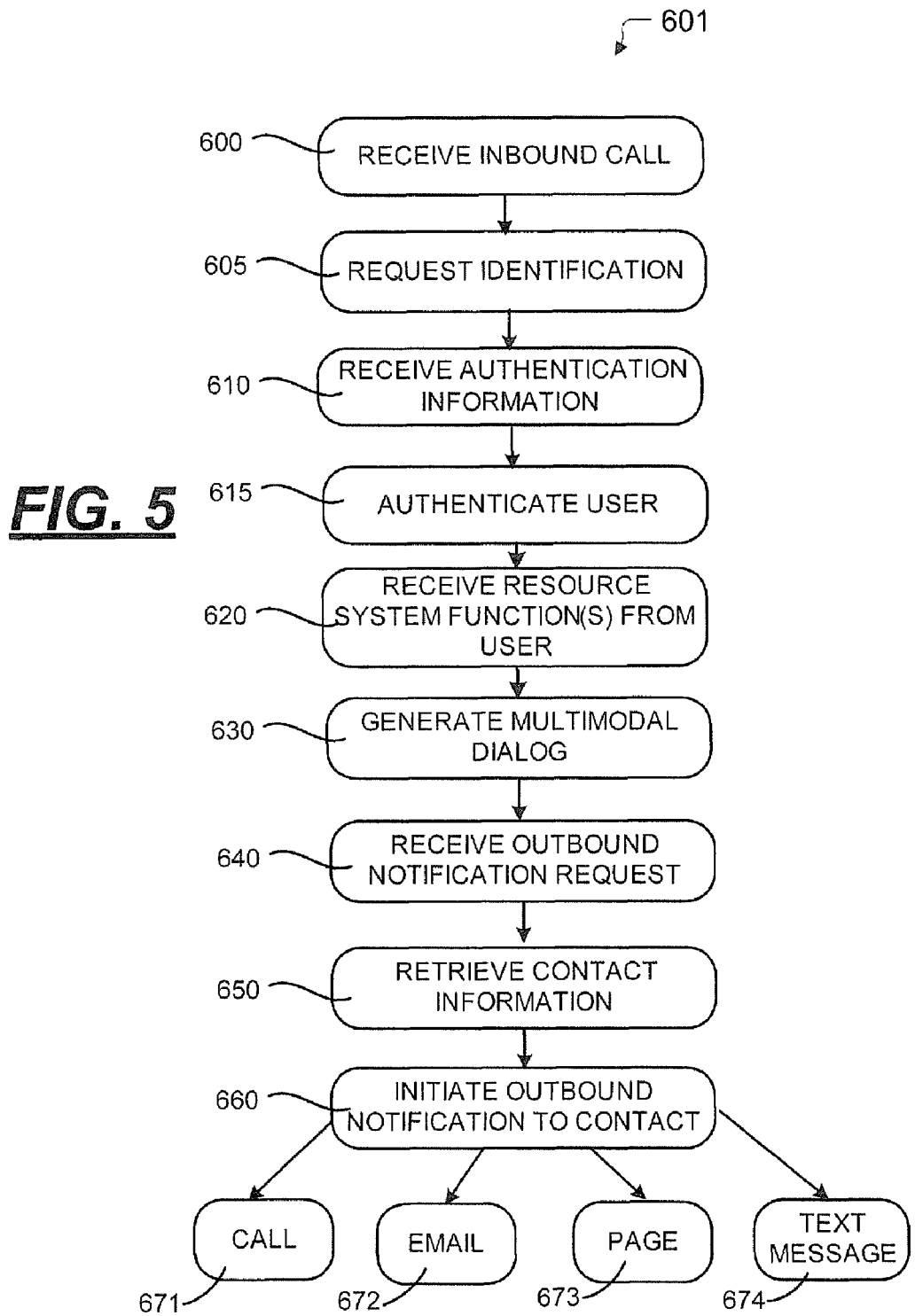
FIG. 5 is an exemplary process flow diagram for providing inbound call functionality in a multimodal system.

Turning now to FIG. 5, an exemplary process 601 is illustrated for receiving an inbound call in one implementation of a multimodal system 210. Process 601 may begin at step 600, where multimodal system 210 receives an inbound call from a resource management system user. Proceeding to step 605, multimodal system 210 may request an identification. The user may then provide the requested authentication information (e.g., voice print, PIN number, password, etc.) via a device 205. Multimodal system 210 may then receive the authentication from the Justice System user, in step 610. Proceeding to step 615, multimodal system 210 may authenticate the resource management system user and serve a voice dialog based on a dynamically generated multimodal document to the user. For example, multimodal system 210 may serve the following dialog: "You have been identified as Parole Officer John Doe. Currently you have 4 parolees under you. Please tell me the name of the parolee you would like to know the details about, or say "List" to listen to the list of the parolees." Process 601 may then proceed to step 620.

In step 620, multimodal system 210 may receive a selected resource name from the user, e.g., "Parolee John Doe Jr." In response, multimodal system 210 may serve a dynamically generated multimodal dialog including information relating to the requested parolee in step 630. For example, the served multimodal dialog may include a status update on the selected resource, e.g., "Parolee John Doe Jr. is one day behind report-in time." As described above, the information provided may be dynamically configured to include only that information that the Justice System user is authorized to receive. Process 601 may then proceed to step 640.

In step 640, multimodal system 210 may receive a user request to place an outbound notification to a particular resource, e.g., a parolee identified in step 630 via the multimodal dialog. In response, in step 650 multimodal system 210 may retrieve parolee information for the requested individual. Proceeding to step 660, multimodal system 210 may initiate an outbound call (i.e., proceed to step 671), send an email (i.e., proceed to step 672), send a page (i.e., proceed to step 673), or send a text message (i.e., proceed to step 674), as examples, to provide a notification to the parolee.

Figure 6:
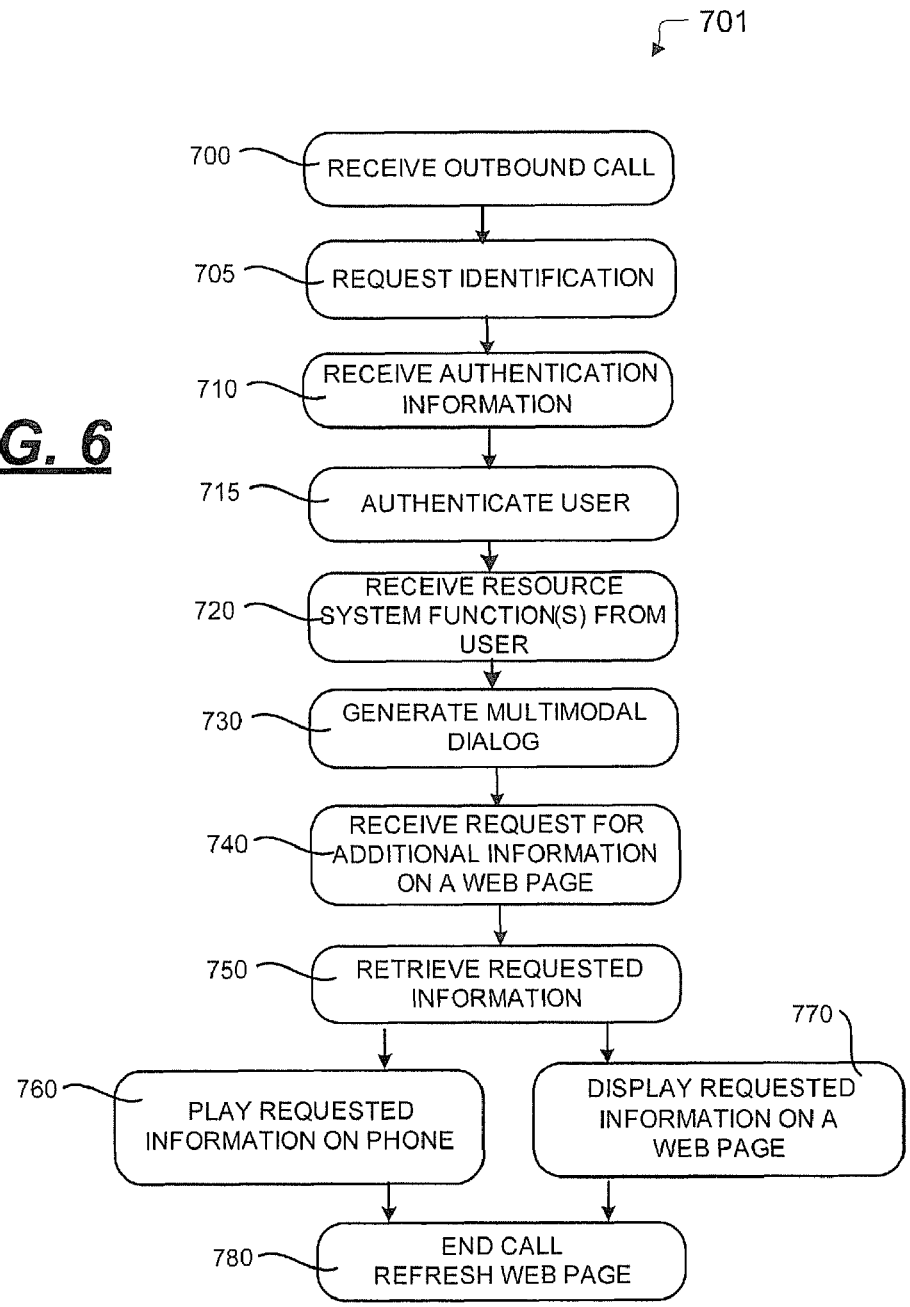
FIG. 6 is an exemplary process flow diagram for providing outbound resource notifications.

Turning now to FIG. 6, a process 701 is illustrated for receiving outbound calls in one implementation of multimodal system 210. Process 701 may begin at step 700, where multimodal system 210 receives an outbound call from a resource management system user, e.g., a Justice System user. Proceeding to step 705, multimodal system 210 requests identification from the user. The user then provides the requested authentication information (e.g., voice print, PIN number, password, etc.), via device 205. In step 710, multimodal system 210 then receives the authentication from the user, through the associated device 205. Process 701 may then proceed to step 715, where multimodal system 210 authenticates the Justice System user and serves a multimodal dialog based on a dynamically generated multimodal document to the user. Process 701 may then proceed to step 720.

In step 720, multimodal system 210 may receive a parolee name from the Justice System user (Parole Officer), e.g., "John Doe Jr." In response, in step 730 multimodal system 210 may serve a dynamically generated multimodal dialog including information relating to the requested parolee. As described above, the information provided may be dynamically configured to include only that information that the Justice System user is authorized to received.

Proceeding to step 740, a request for additional information relating to the resource, e.g., parolee, may be received from the user, e.g., a parole officer, via device 205. For example, the user may initiate a query requesting resources associated with the user, e.g., "How many parolees am I currently supervising?" In response, in step 750 the multimodal system may retrieve the requested information from database(s) 215 and dynamically generate a dialog including the retrieved information. Proceeding to steps 760 and/or 770, multimodal system 210 may display the information for the project on a web page (i.e., 770) and/or play the information on phone (i.e., 760). For example, the dialog may include: "You currently supervise four parolees; their names are - - - ." As described above, the information may be provided in any other modality associated with device 205 that is convenient.

In step 780, multimodal system 210 may receive a user request to end the call, thereby terminating the call. multimodal system 210 may synchronously update the web page in response. Process 701 may then terminate.

Accordingly, a system 200 and various methods are disclosed herein that generally allow multiple users to access and manage resource data via at least one of a plurality of device modalities that are associated with at least one of a plurality of devices that may be employed by the users. Resource data may thus be accessed by a user regardless of a user's location, e.g., with a mobile device. Further, a user may access resource data or information via devices generally available anywhere, e.g., a mobile phone, pay phone, laptop computer, etc., despite being disparately located from a native device of the user, e.g., a work computer, that specifically provides the native application of desired resource data.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method comprising:
receiving a first communication having a first interface modality, said first communication associated with at least one of a plurality of data in a datastore;
receiving a second communication having a second interface modality, said second communication associated with at least one of said plurality of data, wherein said first interface modality is supported by a first device and said second interface modality is supported by a second different device;
generating a multimodal document having instructions for providing a dialog with a device using at least the first interface modality and the second interface modality;
providing the multimodal document through the first and second interface modalities; and
authenticating an identity of one of said first and second devices, wherein the authenticating comprises:
generating a multimodal document requesting that said one of said first and second devices provide authentication information using one of a plurality of user output modalities of said one of said first and second devices;

receiving authentication information from said one of said first and second devices in a format based on said user output modality of said one of said first and second devices to provide the authentication information;

interpreting said authentication information based on the format; and comparing the received authentication information with information stored in a datastore.

2. The method of claim 1, wherein the method is embodied in a resource management system and wherein the method further comprises:

using said authentication information received from the user and information stored in the datastore to determine resources associated with said one of said first and second devices, and resource management functions available to said one of said first and second devices; and generating a multimodal document providing said one of said first and second devices with a list of associated resources.

3. The method of claim 1, wherein generating said multimodal document comprises:

providing a multimodal extensible markup language specification; and generating said multimodal document in accordance with said multimodal extensible markup language specification.

4. The method of claim 1, further comprising:

receiving information from one of said first and second devices, said information generated using a first user output modality of said one of said first and second devices; and interpreting the information received using a modality specific interpretation system.

5. The method of claim 1, wherein said first interface modality includes one of a text input, voice response, and a keypad input, and said second interface modality includes a different one of said text input, voice response, and a keypad input.

6. A system comprising:

a first communication interface configured to provide access to a first device;

a second communication interface configured to provide access to a datastore; and a multimodal system in communication with said first and second communication interfaces, said multimodal system configured to:

receive a first communication request from said first device;

generate a multimodal document in response to said first communication request, said multimodal document comprising instructions allowing for communication with the first device using at least one of a plurality of device interface modalities; and serve the multimodal document to the first device using the first communication interface;

wherein said multimodal system is configured to receive a second communication request from a second device, said second device using a communication protocol different from said first device, and wherein the multimodal system is further configured to serve said multimodal document to said second device using the different communication protocol.

7. The system of claim 6, wherein said multimodal system is configured to receive a communication from said first device in response to said multimodal document, said communication including information in a format consistent with at least a first interface modality of said at least one plurality of interface modalities, and wherein said multimodal system is further configured to:

interpret at least a portion of said communication;

generate a new multimodal document in response to said communication; and serve the new multimodal document to said first device.

8. The system of claim 6, wherein the multimodal system is further configured to manipulate information stored in the datastore based on said communication from said first device, said information including resource data associated with said first device.

9. The system of claim 6, wherein the interface modality of said first device includes one of a text input, voice response, and a keypad input, and the interface modality of said second device includes a different one of said text input, voice response, and a keypad input.

10. The system of claim 6, wherein said multimodal system is configured to receive a communication from said second device in response to said multimodal document, said communication including information in a format consistent with at least a second interface modality of said at least one plurality of user interface modalities, and wherein said multimodal system is further configured to:

interpret at least a portion of said communication;

generate a new multimodal document in response to said communication; and serve said new multimodal document to said first and second devices.

11. The system of claim 6, further comprising an outbound notification system configured to generate said first request and communicate said first request to the multimodal system.

12. The system of claim 11, wherein the system comprises a resource management system, wherein said resource management system comprises a critical state resource data retrieval system configured to determine when a resource associated with the datastore reaches a critical state, wherein the outbound notification system is configured to generate the first request in response to the critical state data retrieval system determining that a resource has reached a critical state.

13. The system of claim 6, further comprising a device authentication system configured to authenticate an identity of said first device by generating a multimodal document requesting authentication information of said first device using at least one of a plurality of user output modalities of a user device, receiving authentication information from said first device in a format based on the output modality used by said first device to provide said authentication information, interpreting said authentication information from the user based on the format; and comparing said received authentication information with information stored in the datastore.

14. The system of claim 6, wherein the system comprises a resource management system and wherein the system further comprises:

a role and accessibility determination system configured to use the authentication information received from the user and information stored in the datastore to determine resources associated with said first device, and resource management functions available to said first device, wherein the multimodal system is configured to generate a multimodal document providing said first device with a list of available resources and resource management functions.

15. A computer program product for providing a multimodal resource management application, the computer program product comprising at least one computer-readable storage medium having computer-readable program code portions stored therein, the computer-readable program code portions comprising:
- a first executable portion for providing the resource management application with access to at least one of a plurality of devices;
- a second executable portion for receiving a first request to communicate from one of said plurality of devices;
- a third executable portion for generating a multimodal document in response to a received request, said multimodal document comprising instructions allowing for communication with said plurality of devices using at least one of a plurality of different user interface modalities;
- a fourth executable portion for serving the multimodal document to said one of said devices using the first executable portion;
- a fifth executable portion configured to receive a second request to communicate with a second one of said devices using a communication protocol different from said first one of said devices; and
- a sixth executable portion for serving said multimodal document to said second one of said devices using said different communication protocol.

16. The computer program product of claim 15, further comprising:
- a seventh executable portion for receiving a communication from said one of said devices in response to said multimodal document, said communication comprising information in a format consistent with at least a first interface modality of said plurality of interface modalities;
- an eighth executable portion for interpreting at least a portion of said communication;
- a ninth executable portion for generating a new multimodal document in response to said communication; and
- a tenth executable portion for serving said new multimodal document to said one of said devices.

17. The computer program product of claim 15, further comprising:
- a seventh executable portion for manipulating information stored in the datastore based on said communication from said one of said user devices.

18. The computer program product of claim 15, further comprising:
- a seventh executable portion configured to receive a communication from said second one of said devices in response to said multimodal document, said communication comprising information in a format consistent with at least a second interface modality of said plurality of user interface modalities;
- an eighth executable portion for interpreting at least a portion of said communication;
- a ninth executable portion for generating a new multimodal document in response to said communication; and
- a tenth executable portion for serving said new multimodal document to said first and second ones of said devices.

19. The computer program product of claim 15, further comprising:
- a seventh executable portion for accessing a datastore comprising information about at least one resource;
- a eighth executable portion for determining when a resource stored in the datastore reaches a critical state; and
- a ninth executable portion for generating said first request in response to said sixth executable portion determining that the resource has reached a critical state.

* * * * *